(12) United States Patent
Botterweck

(10) Patent No.: US 6,915,260 B2
(45) Date of Patent: Jul. 5, 2005

(54) METHOD OF DETERMINING AN EIGENSPACE FOR REPRESENTING A PLURALITY OF TRAINING SPEAKERS

(75) Inventor: Henrik Botterweck, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 527 days.

(21) Appl. No.: 09/961,953

(22) Filed: Sep. 24, 2001

(65) Prior Publication Data

US 2002/0095287 A1 Jul. 18, 2002

(30) Foreign Application Priority Data

Sep. 27, 2000 (DE) .......................................... 100 47 723

(51) Int. Cl.[7] .............................................. G10L 15/00
(52) U.S. Cl. ...................................... 704/250; 704/255
(58) Field of Search ................................ 704/250, 255, 704/256

(56) References Cited

U.S. PATENT DOCUMENTS

| | | | | |
|---|---|---|---|---|
| 5,864,810 A | * | 1/1999 | Digalakis et al. ........... 704/255 |
| 6,141,644 A | * | 10/2000 | Kuhn et al. .................. 704/273 |
| 6,151,575 A | * | 11/2000 | Newman et al. ............. 704/260 |
| 6,327,565 B1 | * | 12/2001 | Kuhn et al. .................. 704/255 |
| 6,343,267 B1 | * | 1/2002 | Kuhn et al. .................. 704/222 |
| 6,571,208 B1 | * | 5/2003 | Kuhn et al. .................. 704/250 |

\* cited by examiner

Primary Examiner—Daniel Abebe

(57) ABSTRACT

Described here is a method of determining an eigenspace for representing a plurality of training speakers, in which first speaker-dependent sets of models are formed for the individual training speakers while training speech data of the individual training speakers are used and the models (SD) of a set of models are described each by a plurality of model parameters. For each speaker a combined model is then displayed in a high-dimensional model space by concatenation of the model parameters of the models of the individual training speakers to a respective coherent super vector. Subsequently, a transformation is carried out while the model space dimension is reduced to obtain eigenspace basis vectors ($\underline{E}_e$), which transformation utilizes a reduction criterion based on the variability of the vectors to be transformed. Then the high-dimensional model space is first in a first step reduced to a speaker subspace by a change of basis, in which speaker subspace all the training speakers are represented. In a second step, inside this speaker subspace, the transformation is applied to the vectors representing the training speakers to obtain the eigenspace basis vectors ($\underline{E}_e$).

13 Claims, 2 Drawing Sheets

Figure 1:
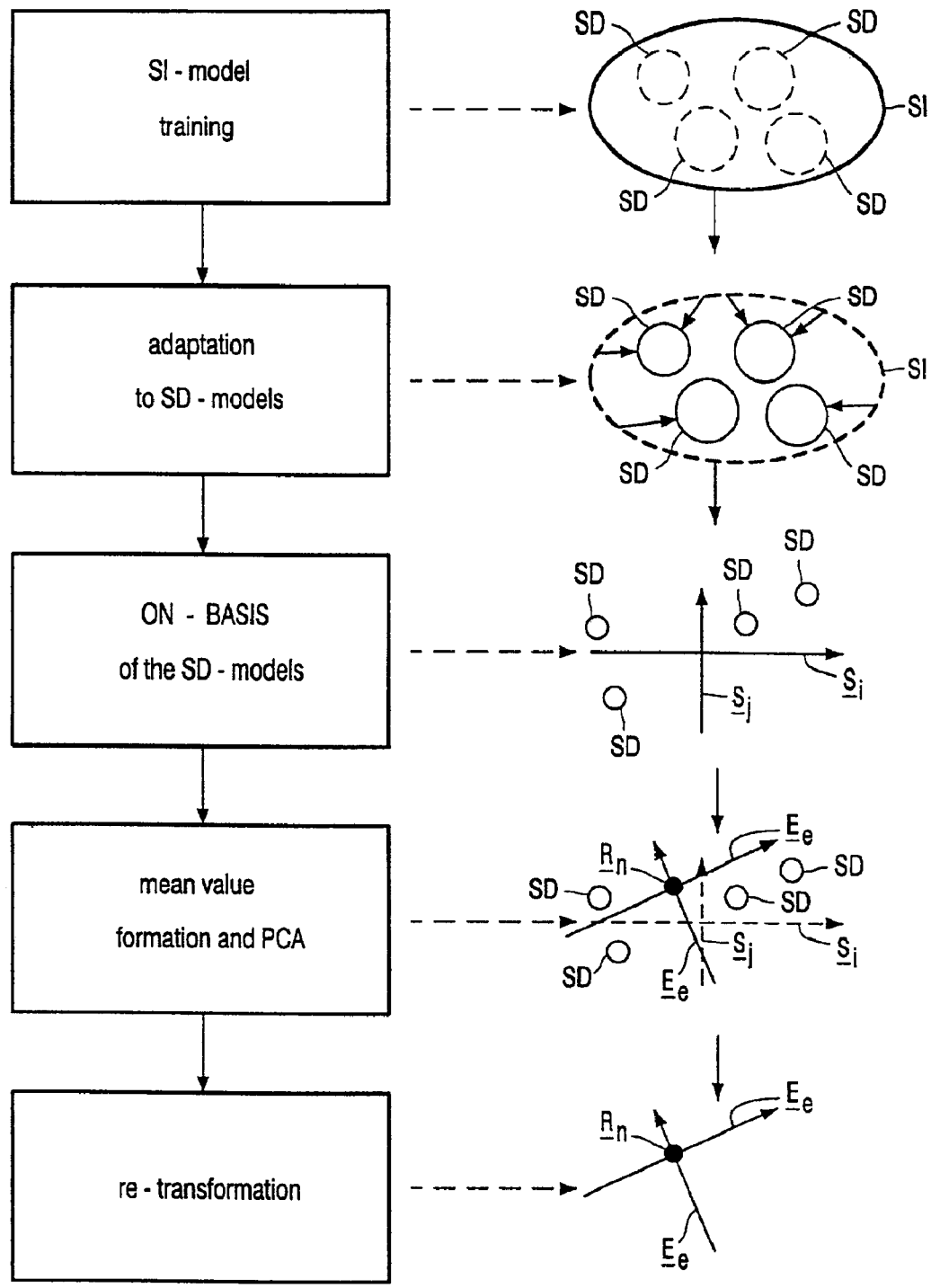

METHOD OF DETERMINING AN EIGENSPACE FOR REPRESENTING A PLURALITY OF TRAINING SPEAKERS

The invention relates to a method of determining an eigenspace for representing a plurality of training speakers. With such a method, initially a speaker-dependent set of models is developed for the individual training speakers while training speech data of the individual training speakers are used and the models of a set of models are described each time by a plurality of model parameters. In a high-dimensional vector space is then displayed a combined model for each speaker, in that a plurality of model parameters of the sets of models of the individual training speakers is concatenated to a respective coherent super vector. Subsequently, for realizing basis vectors for the eigenspace, a transformation is performed, which utilizes a reduction criterion based on the variability of the vectors to be transformed. In addition, the invention relates to a method of speech recognition in which a basic set of models is adapted to a current speaker while the eigenspace generated according to the invention is used.

Speech recognition systems usually work in the way that first the speech signal is spectrally or chronologically analyzed in an attribute analysis unit. In this attribute analysis unit the speech signals are usually divided into sections, so-called frames. These frames are then coded and digitized in suitable form for the further analysis. An observed signal may then be described by a plurality of different attributes or, in a multidimensional attribute space, by an "observation" vector or "attribute" vector. The actual speech recognition, i.e. the recognition of the semantic content of the speech signal, finally takes place in that the sections of the speech signal described by the observation vectors or by a whole sequence of observation vectors, respectively, are compared with models of different practically possible sequences of observations and thus a model is selected that matches best with the observation vector or sequence found. The speech recognition system is therefore to comprise a kind of library of all possible signal sequences from which the speech recognition system can then select the respectively matching signal sequence. That is to say, the speech recognition system contains a set of acoustic models for different acoustic units which could, in principle, practically occur in a speech signal. The acoustic units may be, for example, phonemes or phoneme-like units such as diphones or triphones, in which the model of the phoneme depends on the previous and/or subsequent phoneme within a context. Obviously, the acoustic units may also be complete words. Accordingly, such a set of models may consist of only models of phonemes, diphones, triphones or the like, of words or a mixture of different acoustic units.

A method often used for describing acoustic units i.e. certain sequences of observation vectors, is the use of so-called Hidden Markow models (HM-models). They are stochastic signal models for which it is assumed that a signal sequence is based on a so-called "Markow chain" of different states where certain transition probabilities exist between the individual states. The respective states themselves cannot be recognized then (hidden) and the occurrence of the actual observations in the individual states is described by a probability density in dependence on the respective state. A model for a certain sequence of observations may therefore be described in this concept by the sequence of the various states passed through, by the duration of the stop in the respective states, the transition probability between the states and the probability of occurrence of the individual observations in the respective states. A model for a certain phoneme is then generated, so that first suitable start parameters are used for a model and then, in a so-called training of this model by a change, the parameter is adapted to the phoneme to be modeled of the respective language until an optimal model has been found. The details about the various HM-models, as well as the individual exact parameters to be adapted, do not play an essential role in the present invention and are therefore only described hereinafter insofar as they are necessary for providing a more complete understanding of the invention.

Models may be either speaker-dependent (so-called SD models) or speaker-independent (SI models). Speaker-dependent models are trained exactly to an individual speaker in that the speech recognition system is supplied with a large number of examples of words of the individual speaker beforehand, while the contents of these word examples are known to the system. These examples are called training data. Such speaker-dependent systems or models, respectively, are relatively exact for the respective individual for which it has been trained. However, they are extremely inexact for any other person. With a speaker-independent system, on the other hand, the training of the models takes place based on training data of a large variety of different speakers, to thus generate models with which the system is in a position to understand any person that speaks the respective language. The error rate in such a speaker-independent system when speech data are to be recognized of a speaker who does not belong to the training speakers, however, is about 20 to 25% higher than the error rate for a comparable speaker-dependent system, which was trained specifically for this speaker.

In many applications of speech recognition systems, for example, when used in automatic telephone answering systems, there is unfortunately no possibility of training the system or models, respectively, to a certain speaker beforehand. To improve the performance of such systems, many speech recognition systems have meanwhile the possibility of adapting the system to the speaker during speech recognition, on the basis of the speech data already observed. A simple possibility of this is to transform the observations to be recognized coming from the current speaker, so that they are closer to the observations of a reference speaker for which a speaker-dependent model was trained. A further possibility is to group the training speakers according to their similarity and train a common model for each group of similar speakers. For the respective current speaker the model of the group is then selected which the speaker fits in best. A further, very good and effective method is the adaptation of a basic HM model to the respective speaker i.e. various HM parameters are changed, so that the changed model better matches the respective speaker. With this method a speaker-dependent model is formed during the speech recognition. The two best known model adaptation techniques are the so-called Maximum a Posteriori estimate (MAP) and the Maximum Likelihood Linear Regression method (MLLR). These highly effective techniques, however, have the disadvantage that they need both considerable computing power and time as well as a sufficient number of spoken signals of the new speaker until the suitably formed model is adapted to this new speaker.

EP 0 984 429 A2 therefore proposes a new type of method of adapting a speech recognition system to a speaker to be recognized, which system works with the so-called eigenvoice technique. A starting point of this eigenvoice method is the representation of speakers and their combined acoustic models as elements of a high-dimensional linear space, in the following to be referred to as model space, in which all the parameters describing a speaker are concatenated to a "super vector". A linear transformation is then performed with these super vectors of the training speakers, by which transformation the eigenspace basis vectors for the so-called eigenspace are obtained. This eigenspace is a linear subspace of the high-dimensional model space. The transformation is then performed in the way that the eigenspace basis vectors represent various correlation or discrimination attributes between the various training speakers or models, respectively, of the training speakers. A possibility of the transformation is mentioned herein, for example, the Principal Component Analysis (PCA) in which a correlation matrix is formed by means of the super vectors of the various speakers and the eigenvectors of this correlation matrix are determined to be eigenspace basis vectors. Further possible methods are the "Linear Discriminant Analysis" (LDA), the "Factor Analysis" (FA), the "Independent Component Analysis" (ICA) or the Singular Value Decomposition (SVD). All these transformations are, however, relatively intensive as regards computations. Each of the so-provided eigenspace basis vectors represents a different dimension in which individual speakers can be distinguished from each other. Furthermore, based on the original training material each super vector of each speaker can be described by a linear combination of these basis vectors.

A problem of the eigenvoice method, however, is found in the conversion of this method to be used in the recognition of continuous speech with a large vocabulary. With such a speech recognition there are considerably more possibilities of successive phonemes and there is more often a wear of syllables etc. than when individual fixed commands are given. The real distribution of the observations is therefore too diffuse and there are too many variations. When HM-models are used, for example, an acoustic unit can no longer be described by a simple state or by a plurality of separate states which are described by only a single probability density, for example, a simple Gaussian or Laplace density. Instead, a mixture of various densities is necessary i.e. a plurality of such densities having different weights have to be superimposed to reach a probability density adapted to the real distribution.

If a language is started from that has 42 different phonemes, and if each of these phonemes is described by only three states per phoneme (initial state, middle state, end state), this will already lead to 142 different states which are to be described. When context-dependent phonemes are used, which is very practical when continuous speech is recognized, various context-dependent models are trained for each phoneme, depending on which phoneme immediately precedes and/or immediately succeeds (triphone). For describing such triphones of a language, a total of, for example, 2000 states are necessary. When a sufficient number of different probability densities per state (about 30) are used, there are about 60,000 different probability densities. With the customarily used attribute space of about 30 to 40 dimensions, this leads to a single speaker being described in the end by approximately two million individual model parameters. These model parameters comprise all the attribute parameters for describing 60,000 probability densities in the attribute space while, as a rule, only the mean value of each density is laid down in the attribute space and the variance for all the densities is assumed to be the same and constant. Obviously, for each density also additional parameters can be used, which individually determine the covariance for this density. Besides, the model parameters may comprise, for example, the transition probabilities between the states and further parameters for describing the various HM models. The approximately two million model parameters are then to be concatenated to the super vectors, which leads to a high-dimension model space. It is obvious that the transformations mentioned above for computing the eigenspace basis vectors, such as, for example, the computation of the eigenvectors of a covariance matrix, require very much computational circuitry in an almost $2\times10^6$-dimensional space and enormous main memory capacity is necessary to store the vectors and matrices for the computation operations. Such transformations can hardly be realized with the computers available at present, so that the eigenvoice method for continuous speech recognition systems with a large vocabulary has not been used so far.

It is an object of the present invention to provide a method with which it is possible, also with models having a great many model parameters, to determine an eigenspace.

This object is achieved by a method as claimed in claim 1.

According to the invention, for determining the basis vectors of the eigenspace, the high-dimensional model space is first reduced to a speaker subspace by a simple change of basis, in which subspace the super vectors of all the training speakers are arranged. Such a simple change of basis can also be suitably made without any problem in high-dimensional spaces on present-day computers. In the reduced speaker subspace, the vectors representing the speaker models in this space can actually be transformed for determining the eigenspace basis vectors. Subsequently, there is then a simple reconversion of the found eigenspace basis vectors in the model space.

In a preferred embodiment, the difference vectors of the super vectors are orthonormalized to a selected originating vector to generate the speaker subspace. As an originating vector is then preferably used a mean super vector. This is the super vector whose parameters are the respective mean values of the parameters of the individual speaker-dependent super vectors. To represent n different speakers in this speaker subspace, the speaker subspace is to have a maximum dimension of n–1 i.e. the dimensions of the space, in which then the actual calculation of the basis vectors of the eigenspace is performed, are strongly reduced compared with the dimensions of the original model space, so that considerable computing speed and memory capacity is saved.

A simple change of basis is possible, for example, by a Gram-Schmidt orthonormalization of the vectors involved. Alternatively, also a Löwdin transformation or another suitable method may be used.

The method is particularly suitable for developing eigenspaces for speech systems that work on the basis of the Hidden Markow models mentioned in the introductory part. In principle, such a method can also be used with other models for which the matter is to concatenate a multitude of parameters to super vectors, to thus represent different speakers as dots in a high-dimensional model space and then perform various transformations in this model space so as to detect mutual correlations of the speakers.

During the concatenation of the model parameters to the super vectors, the arrangement of the individual parameters is to be heeded. In principle, the arrangement of the individual parameters relative to one another may be random, it is true, but it should be ensured that a once selected arrangement is selected to be the same for all speakers. More particularly, also the arrangement of the individual attribute parameters, which describe the individual probability densities of a certain state, is to be selected for all the speakers in such manner that the parameters are optimally correlated for all the speakers. Only when all the parameters in the super vectors of the individual speakers are arranged similarly is it ensured that the found basis vectors of the eigenspace correctly represent the desired information for distinguishing different speakers. The correct assignment is all the more difficult, the more model parameters are necessary for describing a single model.

Therefore, in a preferred embodiment of the method according to the invention, in a first step a common speaker-independent set of models for the training speakers is developed, while the training speech data of all the training speakers involved are used. All the training speech data are then used for training respective speaker-independent models for the various acoustic units. Subsequently, in a second step, the training speech data of the individual training speakers are used for adapting the speaker-independent set of models found to the respective training speakers. This adaptation may be effected, for example, with the usual methods such as MAP or MLLR. When the models of the common speaker-independent set of models are adapted to the models of the speaker-dependent sets of models of the individual speakers, the respective significance contents of the speech data are known. This is a so-called supervised adaptation. With this adaptation it can be detected without any problem which model parameters of the models of the speaker-independent set of models are assigned to the individual model parameters of the respective models of the speaker-dependent sets of models, so that also an unambiguous mutual assignment of the parameters can be determined. The concatenation of the individual model parameters of the sets of models to the super vectors is then effected in such manner that the model parameters of the models of the speaker-dependent sets of models, which are assigned to the same model parameters of the same model of the speaker-independent common sets of models, are also arranged at the respective identical positions of the respective super vectors. Thus, also with an extremely high number of different model parameters, an unambiguous arrangement of the individual parameters in the super vectors is guaranteed.

The various basis vectors of the eigenspace are preferably arranged according to their weight for distinguishing different speakers. This provides the possibility of reducing the eigenspace for the use in the speech recognition system even more in that the least important basis vectors of the eigenspace, which contain only little information by which the speakers can be distinguished, are rejected. The dimension of the eigenspace used last in a speaker recognition will then be much smaller than the number of training speakers. Thus, few coordinates will suffice to characterize the individual speaker-dependent models of the training speakers in the thus provided a priori optimized eigenspace within the high-dimensional model space and to perform an adaptation to a new speaker. The number of the necessary coordinates is then only a fraction of the number of degrees of freedom of other adaptation methods such as, for example, MLLR. When the PCA method is implemented for determining the eigenvectors of the covariance matrix of the super vectors as eigenspace basis vectors, the evaluation of the eigenvectors may be effected based on the associated eigenvalues. Eigenvectors having higher eigenvalues are more important than eigenvectors having lower eigenvalues.

According to the invention such an eigenspace can be used in a method of speech recognition, in which first a set of basic models is adapted to a current speaker while using the eigenspace, which adaptation is made on account of already observed speech data to be recognized of this speaker.

There are various possibilities for this. Several of them are mentioned in EP 0 984 429 A2 mentioned above. The adaptation of the basic model to the respective speakers then takes place in the manner that the adapted model finally lies within the eigenspace, i.e. can be represented as a linear combination of the various basis vectors of the eigenspace.

The simplest method is the direct projection of the basic model in the eigenspace. Such a projection finds exactly the point within the eigenspace which lies closest to the new speaker's basic model lying outside the eigenspace. Unfortunately, this method is too coarse. In addition, such a projection operation comes up only when there is sufficient input speech material for the new speaker, so that all acoustic units are represented at least once in the data. In many applications these conditions cannot be satisfied.

As an alternative there is the possibility of the method also proposed in the above document, which is the method of Maximum Likelihood Eigenvoice Decomposition (MLED). With this method a point within the eigenspace is found, which exactly represents the super vector that belongs to a Hidden Markow Model set, which has the greatest probability of being generated by the speech of the new speaker. This particular technique of this method will not be further discussed here. Reference is made in this respect to EP 0 984 429 A2.

With the two methods, also for such speakers who have characteristics that differ very much from the various characteristics of the training speaker, only one model set within the eigenspace is produced. Since such speakers, however, are not optimally represented by a model set in the eigenspace of the training speakers, it is practical first to develop a model set within the eigenspace with a method according to the invention and utilize this set as a new basic model set for a further optimal adaptation by means of a MAP or MLLR method. Obviously, however, also any other method may be used to adapt the basic model set to the new speakers while utilizing the eigenspace.

With the method according to the invention a relatively fast, simple speaker adaptation is possible with the recognition of a continuous speech signal. The predominant computing cost is to be made only once for processing the training speech material and for finding the eigenspace, while this computing cost itself can be controlled without any problem with continuous speech recognition with a large vocabulary, because a basis change according to the invention is made for reducing the parameter space to a subspace. In this manner the eigenspace can be efficiently formed without directly using the millions of parameters.

The invention will be further explained with reference to the appended drawing Figures based on example of embodiment. The characteristic attributes discussed hereinafter and the attributes already described above may be of essence to the invention not only in said combinations, but also individually or in other combinations.

Figure 2:
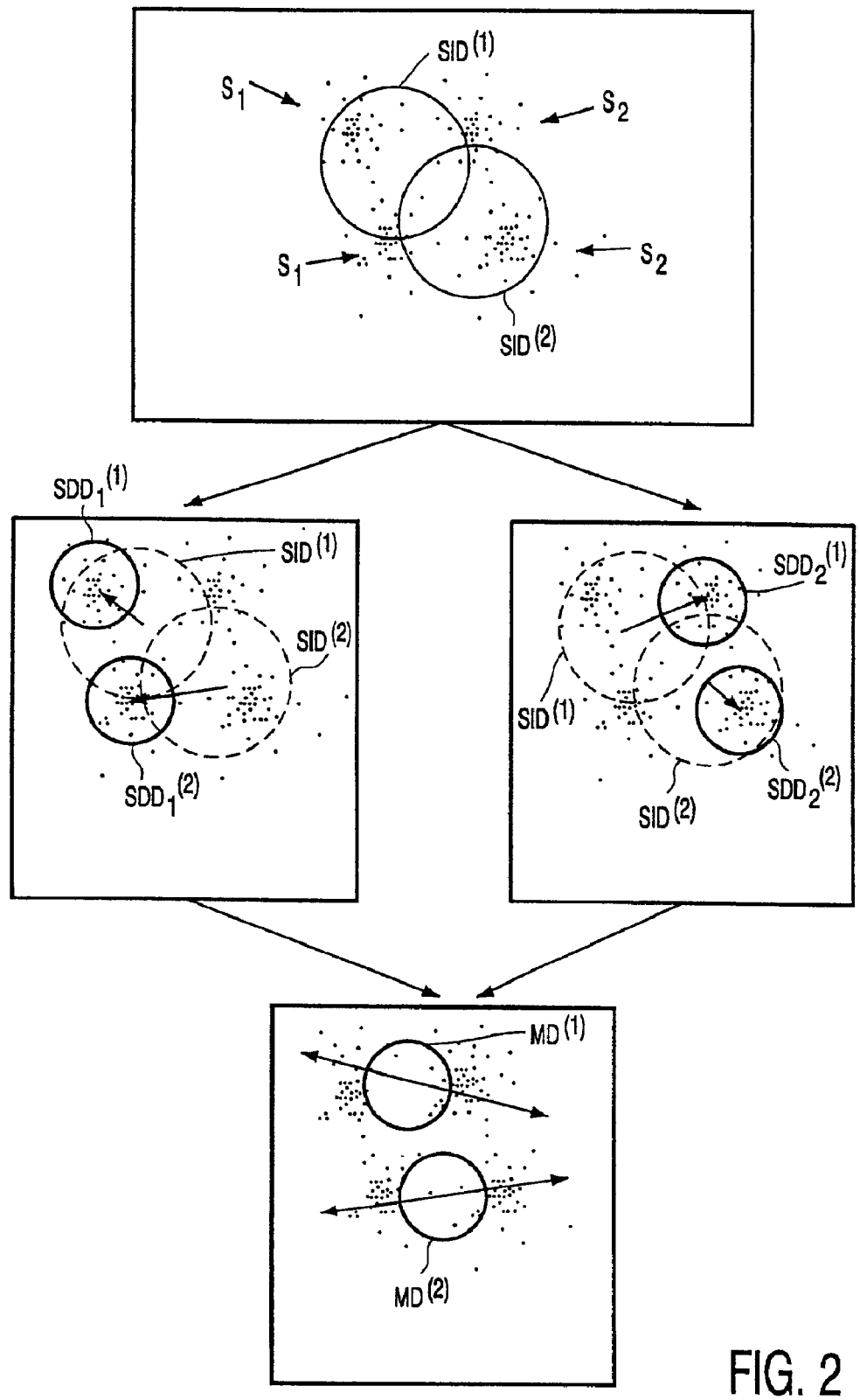

In these drawings:

FIG. 1 gives a diagrammatic representation of the order of the various steps of the method according to the invention for generating an eigenspace, FIG. 2 is an illustration of the adaptation of a speaker-independent model to two different speakers.

With the example of embodiment explained here, the method according to the invention first starts in that the whole speech data material of the training speakers, in the concrete example of embodiment of 300 different speakers, is used for training a common speaker-independent set of models with different speaker-independent models SI for the various acoustic units.

Such a speaker-independent model SI for an acoustic unit is shown in a solid-line elliptical distribution in the first step. In reality, this is a model consisting of three states, which are described by a plurality of probability densities. These densities are again described by 33 acoustic attribute parameters, which are each the mean value of the probability densities in the attribute space. In the following example of embodiment, 16 mel-cepstral coefficients and their 16 first time derivatives are used as attributes. The second derivative of the energy i.e. of the $0^{th}$ mel-cepstral coefficient is added as the $33^{rd}$ attribute. Obviously, such a model may also be described by fewer parameters, or by even further additional parameters, for example, the variances of the density distributions.

In a second step, these speaker-independent models SI are adapted to the individual speakers while the respective training material of the training speakers is used, i.e. speaker-dependent models SD are generated. In the example of embodiment shown in FIG. 1 the speaker-independent model SI is adapted to four different speakers.

In FIG. 2 the method is clarified a little more with reference to an example having only two training speakers $S_1$, $S_2$. The dots correspond to respectively occurred observations of a specific acoustic unit, which was spoken by the two training speakers $S_1$, $S_2$. This is a representation in an attribute space which here has only two dimensions for clarity. Customarily, however, a single observation is not described by two, but by a multitude—in the present example of embodiment as stated, 33—different attribute parameters. The attribute space is therefore in the present actual example of embodiment not two-dimensional as shown in FIG. 2, but 33-dimensional.

As may be noticed, the individual observations of the specific acoustic unit for the two speakers $S_1$, $S_2$ is spatially divided over wide areas while, in the case shown, for the two speakers $S_1$, $S_2$ two local maximums have clearly been formed. In one model this acoustic unit cannot therefore be sufficiently well formed with a single Gaussian probability density, but a superpositioning of at least two probability densities is to be used to represent the two maximums in the real spatial distribution of the observations. In reality the distribution of the observations is usually even more diffuse, so that for a good modeling about 30 probability densities are superimposed.

To determine what density of a model for a certain acoustic unit of a certain speaker corresponds to what density of the respective model for the same acoustic unit of another speaker, first a common speaker-independent model is trained from all the training speech data. In FIG. 2 this model has exactly two speaker-independent Gaussian probability densities $SID^{(1)}$, $SID^{(2)}$. In a next step this speaker-independent model is then adapted to the two individual speakers $S_1$, $S_2$, while the known training speech material of the two individual speakers $S_1$, $S_2$ can be used. This leads to a speaker-dependent model having two probability densities $SDD^{(1)}_1$, $SDD^{(2)}_1$ for the first speaker $S_1$ and to another speaker-dependent model having two probability densities $SDD^{(1)}_2$, $SDD^{(2)}_2$ for the second speaker $S_2$. Since the models were developed from the same speaker-independent start model, the assignment of the probability densities is clear; the probability densities $SDD^{(1)}_1$, $SDD^{(2)}_1$, $SDD^{(1)}_2$, $SDD^{(2)}_2$ of the two speakers $S_1$, $S_2$, which densities were developed from the same probability density $SID^{(1)}$, $SID^{(2)}$ of the speaker-independent model correspond. In the simplified case shown in FIG. 2 this correct assignment can also be seen with the naked eye from the position of the local maximums of the distributions of the individual observations of the speakers $S_1$, $S_2$. The problem becomes evident, however, when it is considered that with a real evaluation of training speech data, not two distributions in a two-dimensional space, but approximately 30 distributions in a 33-dimensional space can be assigned to one another, while the individual distributions of a state of a model are slightly overlapping.

The assignment method according to the invention achieves that for each of the speakers there is a clear parameter assignment of each individual density, of each individual state and each individual model. Based on this known ordering, all the parameters for all the speakers can then be concatenated in one super vector per speaker, while it is ensured that in all the super vectors for all the speakers the same order of the parameters is present. With the aid of these super vectors, each individual speaker can be represented exactly as a dot in the high-dimensional model space, in the present example of embodiment an approximately $2 \times 10^6$-dimensional space. This model space contains all the information of the speaker variations during the training.

For effectively using the information for a later speech recognition, a reduction of the data set, more particularly, a reduction of the dimensions of the model space is necessary, without essential information being lost then. For this purpose, the eigenvoice method is used, in which a transformation is performed of the super vectors of the individual speakers to find the basis vectors of an eigenspace. With this transformation, reduction criterions are used, which are based on the mutual variability, for example, on the variance, of the vectors to be transformed. A possibility of the transformation is—as discussed in the introductory part—the Principal Component Analysis (PCA). Also other suitable methods such as the Linear Discriminant Analysis (LDA), the Factor Analysis (FA), the Independent Component Analysis (ICA) or the Singular Value Decomposition (SVD) can obviously be used.

In the following example of embodiment it is assumed that for finding the eigenspace basis vectors, a PCA transformation is performed i.e. the eigenvectors of a covariance matrix determined by means of the super vectors of the individual speakers and the associated eigenvalues are searched for. These eigenvectors then form the eigenspace basis vectors.

In the following detailed mathematical description of this method, the following notations are used:

$n_P$ is the number of the model parameters to be adapted; in the present example of embodiment the dimension of the attribute space (i.e. the number of the acoustic attribute parameters) multiplied by the total number of probability densities $n_S$ is the number of training speakers by which the training speech data were generated; $n_S \ll n_P$ $\rho$ is the model space i.e. the space of all the model parameters $n_P$, in the present example of embodiment they are all the mean values of all the probability densities in the attribute space. (Linear structures are used here.) This is to be taken into account when parameters to be adapted are represented. If, for example, variances $\sigma$ are adapted, $\log(\sigma)$ is presented as a good coordinate to avoid transformations to very small or even negative values of $\sigma$. $\rho$ has the structure of an affine euclidian space, which means that vectors of an $n_P$-dimensional vector space can be used to define translations into $\rho$ in a natural way. The elements of $\rho$ are simply underlined in the following. Linear mappings in this space are underlined twice.

$\underline{R}_i$ is an element of $\rho$ (for example, a set of model parameters of a possible speaker), i.e. a super vector of a speaker; i=1 to $n_S$.

Instead of the covariance matrix of the super vectors themselves, the covariance matrix is determined of the difference vectors $\underline{D}_i$ of the super vectors to a "mean super vector" $\underline{R}_M$ of all the speakers.

Starting point for this is the determination of the mean value $\underline{R}_M$ for the super vectors of all the $\underline{R}_i$ of all the speakers:

$$R_M = \frac{1}{n_S} \sum_i R_i \quad (1)$$

This mean super vector $\underline{R}_M$ is, as shown in formula (1), a super vector of all the speakers averaged component-by-component and thus represents an average set of models of the individual speaker-dependent sets of models of the training speakers.

Subsequently, the deviations i.e. the difference vectors $\underline{D}_i$ of the individual super vectors $\underline{R}_i$ from this mean super vector $\underline{R}_M$ are determined:

$$\underline{D}_i = \underline{R}_i - \underline{R}_M \quad (2)$$

All further computations now take place with these difference vectors $\underline{D}_i$.

FIG. 2 shows in the method step shown bottommost for the two respective paired speaker-dependent densities $SDD^{(1)}{}_1$, $SDD^{(1)}{}_2$ and $SDD^{(2)}{}_1$, $SDD^{(2)}{}_2$ a mean density $MD^{(1)}$, $MD^{(2)}$. They are the densities $MD^{(1)}$, $MD^{(2)}$ that have the same variance as the speaker-dependent densities $SDD^{(1)}{}_1$, $SDD^{(1)}{}_2$, $SDD^{(2)}{}_1$, $SDD^{(2)}{}_2$. The mean value of these mean densities $MD^{(1)}$, $MD^{(2)}$ is the mean value of the mean values of the respective individual densities $SDD^{(1)}{}_1$, $SDD^{(1)}{}_2$ and $SDD^{(2)}{}_1$, $SDD^{(2)}{}_2$ of the two speakers $S_1$, $S_2$.

The covariance matrix $\underline{\underline{K}}$ of the difference vectors $\underline{D}_i$ is obtained from the multiplication of the vectors $\underline{D}_i$ as rows in an $n_S \times n_P$ matrix $\underline{\underline{D}}$ with its transformed $\underline{\underline{D}}^{TP}$:

$$\underline{\underline{K}} = \underline{\underline{D}}^{TP} \underline{\underline{D}} \quad (3)$$

The in general $n_S$ eigenvectors $\underline{E}_1, \ldots, \underline{E}_{n_S}$ of this covariance matrix $\underline{\underline{K}}$ having eigenvalue>0 are the eigenspace basis vectors searched for as such. These PCA eigenvectors $n_s$ are the main axes of the covariance matrix $\underline{\underline{K}}$ or the "lethargy tensor". The eigenvectors each time correspond to the axes along which the individual speakers are distinguished from each other. Since the covariance matrix $\underline{\underline{K}}$ was built from the difference vectors $\underline{D}_i$ of the super vectors $\underline{R}_i$ formed to become the mean super vector $\underline{R}_M$, the eigenvectors $\underline{E}_1, \ldots, \underline{E}_{n_S}$ run through the mean super vector $\underline{R}_M$, which forms the origin of the eigenspace.

For two dimensions, the directions of the eigenvectors in the lower part of FIG. 2 are illustrated. They run through the center of the mean densities $MD^{(1)}$, $MD^{(2)}$ formed by the two speaker-dependent densities $SDD^{(1)}{}_1$, $SDD^{(1)}{}_2$ and $SDD^{(2)}{}_1$, $SDD^{(2)}{}_2$ in the direction of connection direction of the two speaker-dependent densities $SDD^{(1)}{}_1$, $SDD^{(1)}{}_2$ and $SDD^{(2)}{}_1$, $SDD^{(2)}{}_2$, each belonging to a respective mean density $MD^{(1)}$, $MD^{(2)}$.

Since such transformations as the computation of the eigenvectors of a covariance matrix in a substantially $2 \times 10^6$ dimensional space requires extremely much computational circuitry and an enormous main memory capacity is necessary, these transformations can hardly be realized with the computers available at present. Therefore, according to the invention first a further step is carried out to reduce the space before the actual calculation of the eigenspace basis vectors.

For this purpose, an orthonormal basis is searched for, which covers a sub-space (in the following also called speaker sub-space) within the model space, in which sub-space all the difference vectors are represented which belong to the individual speakers or their models, respectively. To find this orthonormal basis, a single basis transformation is performed which requires relatively little computational circuitry. In the following example of embodiment the Gram-Schmidt orthonormalization method is chosen. Obviously, also another simple transformation method can be used for a change of basis, for example, a Löwdin transformation.

When the Gram-Schmidt orthonormalization method is executed, first one of the difference vectors, for example $\underline{D}_1$ is used as a first Schmidt basis vector $\underline{S}_1$ of the orthonormal basis searched for and only standardized. Subsequently, the second difference vector $\underline{D}_2$ is orthonormalized to this first Schmidt-basis vector $\underline{S}_1$ in that this second difference vector $\underline{D}_2$ is first projected on the first found Schmidt-basis vector $\underline{S}_1$ and the component parallel with the first Schmidt-basis vector $\underline{S}_1$ of the second difference vector $\underline{D}_2$ is subtracted from the second difference vector $\underline{D}_2$. The remaining component of the second difference vector $\underline{D}_2$, which component is perpendicular to the first Schmidt-basis vector $\underline{S}_1$, is then standardized and thus forms the second Schmidt-basis vector $\underline{S}_2$. Accordingly is done with these further difference vectors $\underline{D}_3$ to $\underline{D}_S$, while first all the components parallel with the already existing Schmidt-basis vectors $\underline{S}_1$ are subtracted and the component perpendicular thereto is standardized as a new Schmidt-basis vector $\underline{S}_3$ to $\underline{S}_S$.

Since also such an orthonormalization of 300 vectors in a dimensional space of about $2 \times 10^6$ cannot be performed without further measures because of the limited storage capacity in normal computers, in the concrete example of embodiment this orthonormalization is performed block by block. It is then assumed that the main memory of the computer is capable of simultaneously storing 2n-super vectors. The procedure is then as follows:

First the 2n-vectors $\underline{D}_{1 \ldots 2n}$ are orthonormalized and their representation is stored in the new found basis $\underline{S}_{1 \ldots 2n}$.

For each further block of n-vectors $\underline{D}_i$ first for each block of n orthonormalized Schmidt-basis vectors $\underline{S}_j$, which were already found, the projection of the $\underline{D}_i$ on this $\underline{S}_j$ is subtracted. The projection coefficients $\underline{D}_i$ in the orthonormal basis fou are then stored for the representation of the $\underline{D}_i$ in the orthonormal basis. Subsequently, the rest, i.e. the perpendicular components are mutually orthonormalized. The newly found Schmidt-basis vectors $\underline{S}_j$ of the orthonormal basis and the representation coefficients of the individual difference vectors $\underline{D}_i$ in this basis are then again stored.

Such a Gram-Schmidt orthonormalization needs $$n_P \left( \frac{3}{2} n_S (n_S - 1) + n_S \right) \approx \frac{3}{2} n_S^2 m_P \quad (4)$$

floating point operations. They are, for example, with 300 speakers and 1 million dimensions, about $10^{11}$ individual operations, which can be carried out in about one to two seconds CPU time.

Since the difference vectors $\underline{D}_i$ are correlated via the mean super vector $\underline{R}_M$ according to the formulae (1) and (2), they are linearly dependent. Accordingly, an orthonormal basis vector is needed less than there are training speakers. This corresponds to the example to illustrate that three dots in a three-dimensional space can always be represented in a common plane i.e. also here a maximum of a two-dimensional sub-space is necessary for representing the three dots of the three-dimensional space. The saving of one dimension (since the degree of freedom for the information—here unessential anyway—of the position of the speaker relative to the absolute zero of the model space is saved) is a reason why in the present example of embodiment the difference vectors $\underline{D}_i$ of the speakers and not the super vectors $\underline{R}_i$ themselves are used for forming the speaker sub-space and for computing the covariance matrix. Furthermore, the coordinate jump in the eigenspace would otherwise be included, which, however, does not form a practical contribution to the speaker adaptation.

If desired, the super vector of the originally created common speaker-independent model can furthermore be represented for all the training speakers in this new Schmidt orthonormal basis. In this case the basis is naturally increased by one dimension. The dimension of the sub-space then corresponds to the number of speakers, because the common speaker-independent model is represented by its own super vector irrespective of the super vectors of the individual speakers, and thus represents an additionally mixed speaker which has an extremely large variance with regard to the individual acoustic units.

In lieu of the matrix $\underline{\underline{D}}$ of the distance vectors $\underline{D}_i$ in the complete model space, now the representations of the difference vectors $\underline{D}_i$ can be combined within the Schmidt orthonormal basis of the speech sub-space in rows for a matrix $\underline{\underline{\theta}}$. This matrix $\underline{\underline{\theta}}$ is an $n_S \times n_S$ matrix i.e. it has only 300 times 300 elements. In contrast, the matrix $\underline{\underline{D}}$ of the difference vectors $\underline{D}_i$, in the original model space has 300 times about 2 million elements.

For the sought covariance matrix $\underline{\underline{K}}$ of the difference vectors $\underline{D}_i$ then holds $$\underline{\underline{K}} = \underline{\underline{D}}^{tr}\underline{\underline{D}} \qquad (5)$$

$$= \underline{\underline{S}}^{tr}\underline{\underline{\theta}}^{tr}\underline{\underline{\theta}}\,\underline{\underline{S}}$$

where $\underline{\underline{S}}$ is an $n_S \times n_P$ matrix of the basis vectors $\underline{S}_i$ of the Schmidt orthonormal basis combined in columns. Since the basis vectors $\underline{S}_i$ are orthonormal, a diagonaling of $\underline{\underline{\theta}}^{tr}\underline{\underline{\theta}}$ a subsequent retransformation with the matrix $\underline{\underline{S}}$ is sufficient for finding the PCA eigenvectors $\underline{E}_1, \ldots \underline{E}_{n_S}$ in the model space. Since the vectors $\underline{D}_i$ themselves have led to the orthonormalization, the matrix $\underline{\underline{\theta}}$ of the representations of the difference vectors $\underline{D}_i$ in the Schmidt orthonormal basis is a triangular matrix, which renders the diagonaling of $\underline{\underline{\theta}}^{tr}\underline{\underline{\theta}}$ extremely simple.

The result is then an eigenspace whose dimension corresponds to the number of speakers–1, whose origin lies in the center of all original super vectors of the individual speakers and its basis vectors $\underline{E}_1, \ldots \underline{E}_{n_S}$ run along the variabilities of the individual speakers.

As an alternative, it is naturally also possible first to find an orthonormal basis of the super vectors themselves via a single change of basis, for example, a Gram-Schmidt orthonormalization. This basis found in this manner may then be shifted in the origin to the mean value of all the super vectors and, subsequently, the PCA method is executed first for determining the eigenvectors. This method of forming a Schmidt orthonormal basis from the super vectors themselves, a subsequent averaging in the new basis and a subsequent implementation of the PCA method as well as the subsequent retransformation, is shown in FIG. 1 in the last three method steps.

Naturally, the PCA method can also be executed with the orthonormal basis of the super vectors found by the single change of basis and, subsequently, a transformation to a desired origin. Furthermore, instead of the mean value of all the super vectors, also the super vector of the common speaker-independent model of all the training speakers may be used as the origin for the eigenspace.

The eigenspace found (and the representations of the speakers herein) is already considerably reduced compared to the original model space and still contains all information about the speaker variations in the training. However, it is still too complex to use during a rapid recognition. Therefore it is necessary for the dimension to be reduced more. This may be achieved in that simply several of the eigenvectors are rejected.

For this purpose, in the PCA method not only the eigenvectors, but also the associated eigenvalues of the covariance matrix $\underline{\underline{K}}$ may be determined. (eigenvalues are understood to mean in the sense of this document, unlike European patent application EP 0 984 429 A2 mentioned above, not the coefficients of a model when represented as a linear combination of the eigenvectors, but of the eigenvalue e belonging to the respective eigenvector $\underline{E}_e$ of the matrix $\underline{\underline{K}}$; for which holds: $\underline{E}_e \underline{\underline{K}} = e\underline{\underline{K}}$). These eigenvalues may be used for determining an order of the eigenvectors $\underline{E}_e$. The higher the eigenvalue, the more important the associated eigenvector $\underline{E}_e$, is for distinguishing between two different speakers. Therefore it is possible to select a certain number $n_E$ of the most important eigenvectors, which are actually to be used for spreading out an eigenspace for a speech recognition system. In an example of embodiment of the method already implemented, they are only the eigenvectors having the ten largest eigenvalues, in another example the eigenvectors having the 50 most important eigenvalues.

It is self-evident that then only these eigenvectors actually used for spreading out the eigenspace, the so-called eigenvoices $\underline{E}_e$, are to be retransformed into the model space and not all the eigenvectors found of the covariance matrix $\underline{\underline{K}}$. By selecting the basis for the eigenspace it is ensured that when a super vector $\underline{R}_i$ $\underline{R}_i$ is projected on the reduced eigenspace it is ensured that with a projection of a super vector $\underline{R}_i$ on the reduced eigenspace with only $n_E$ dimensions, having the original super vector $\underline{R}_i$, the resulting mean square error is minimized.

The eigenspace found in this manner may be used in several ways to adapt a basic model to a new speaker in a suitable way and in the fastest possible way. So far this eigenspace can also be used as a complete data set in various speech recognition systems, which utilize a data in a different way for adapting a basic model to a new speaker, which data set already contains all the essential information of the training speech data in pre-evaluated manner.

What is claimed is:

1. A method of determining an eigenspace for representing a plurality of training speakers, the method comprising the steps of:

developing speaker-dependent sets of models for the individual training speakers while training speech data of the individual training speakers are used, the models (SD) of a set of models being described each time by a plurality of model parameters;

displaying a combined model for each speaker in a high-dimensional vector space (model space) by concatenation of a plurality of the model parameters of the sets of models of the individual training speakers to a respective coherent supervector;

performing a transformation of the supervector to derive eigenspace basis vectors ($\underline{E}_c$),said transformation utilizing a reduction criterion based on the variability of the supervectors to be transformed characterized in that the high dimensional model space is in one step first reduced to a speaker subspace by a change of basis, in which speaker subspace all the training speakers are represented, and then, in a next step, inside this speaker subspace, the transformation is applied to the vectors representing the training speakers to obtain the eigenspace basis vectors ($E_c$) wherein the basis (Si,Sj) of the speaker subspace is spread from orthogonalized supervectors of the sets of models or from orthogonalized difference vectors of the supervectors of the sets of models to a selected origin and the origin of the basis (Si,Sj) of the sneaker subspace is selected such that the mean value of all the training speakers lies in the origin.

2. The method as claimed in 1, wherein for developing an orthonormal basis (Si, Sj) of the speaker subspace the Gram Schmidt orthonormalization method is used.

3. The method as claimed in claim 1, wherein the formation of said supervectors comprise the steps of:

developing a common speaker-independent set of models for the training speakers while the training speech data of the training speakers are used;

adapting the speaker-independent set of models to the individual training speakers to develop the speaker-dependent sets of models while the respective training speech data of the individual training speakers are used;

monitoring the assignment of the model parameters of the models (SI) of the speaker-independent set of models to the model parameters of the models (SD) of the speaker-dependent sets of models when the speaker-independent set of models is adapted to the individual training speakers; and concatenating the plurality of the model parameters of the individual sets of models to the supervectors in the way that the model parameters of the models (SD) of the speaker-dependent sets of model, which are assigned to the same model parameters of the same model (SI) of the speaker-independent set of models, are arranged at the corresponding positions of the respective supervectors.

4. The method as claimed in claim 1, wherein the models (SI, SD) are Hidden Markov models for which each state of a single model (SI, SD) is described by a respective mixture of a plurality of probability densities and the probability densities are each described by a plurality of acoustic attributes in an acoustic attribute space.

5. The method as claimed in claim 1, wherein associated ordering attributes are determined for the eigenspace basis vectors ($E_c$).

6. The method as claimed in claim 5, wherein the eigenspace basis vectors ($E_c$) are the eigenvectors of a correlation matrix determined by means of the supervectors and the ordering attributes are the eigenvalues belonging to the eigenvectors.

7. A The method as claimed in claim 5, wherein for reducing the dimension of the eigenspace a certain number of eigenspace basis vectors ($E_c$) is rejected while the ordering attributes are taken into account.

8. A speech recognition method in which a basic set of models is adapted to a current speaker on the basis of already observed speech data to be recognized of this speaker while an eigenspace is used, which eigenspace was determined based on training speech data of a plurality of training speakers in accordance with a method as claimed in claim 7.

9. A computer program with program code means for executing all the steps of a method as claimed in claim 7 when the program is executed on a computer.

10. A computer program with program code means as claimed in claim 9, which are stored on a computer-readable data carrier.

11. A system for determining an eigenspace for representing a plurality of training speakers, comprising:

a processor in communication with a memory, said processor executing code for:

developing speaker-dependent sets of models for the individual training speakers while training speech data of the individual training speakers are used, the models (SD) of a set of models being described each time by a plurality of model parameters;

displaying a combined model for each speaker in a high-dimensional vector space (model space) by concatenation of a plurality of the model parameters of the sets of models of the individual training speakers to a respective coherent supervector;

performing a transformation on the supervectors to derive eigenspace basis vectors ($E_c$), said transformation utilizing a reduction criterion based on the variability of the supervectors to be transformed characterized in that the high dimensional model space is in one step first reduced to a speaker subspace by a change of basis, in which speaker subspace all the training speakers are represented, applying inside this speaker subspace, the transformation to the vectors representing the training speakers to obtain the eigenspace basis vectors ($E_c$) wherein the basis (Si, Sj) of the speaker subspace is spread from orthogonalized supervectors of the sets of models or from orthogonalized difference vectors of the supervectors of the sets of models to a selected origin and the origin of the basis (Si,Sj) of the speaker subspace is selected such that the mean value of all the training speakers lies in the origin.

12. The system as recited in claim 11, further comprising:

an input/output device in communication with said processor.

13. The system as recited in claim 11, wherein said code is stored in said memory.

* * * * *